(12) United States Patent
Kikuchi et al.

(10) Patent No.: US 11,276,429 B2
(45) Date of Patent: Mar. 15, 2022

(54) MAGNETIC RECORDING MEDIUM INCLUDING COMPOUND HAVING A SALT STRUCTURE AND MAGNETIC RECORDING AND REPRODUCING APPARATUS

(71) Applicant: FUJIFILM Corporation, Tokyo (JP)

(72) Inventors: Wataru Kikuchi, Minami-ashigara (JP); So Matsuyama, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/830,752

(22) Filed: Mar. 26, 2020

(65) Prior Publication Data
US 2020/0312362 A1    Oct. 1, 2020

(30) Foreign Application Priority Data

Mar. 27, 2019  (JP) .............................. JP2019-061238

(51) Int. Cl.
| | | |
|---|---|---|
| G11B 5/71 | (2006.01) | |
| G11B 5/78 | (2006.01) | |
| G11B 5/733 | (2006.01) | |
| G11B 5/706 | (2006.01) | |
| G11B 5/702 | (2006.01) | |
| G11B 5/708 | (2006.01) | |
| G11B 5/735 | (2006.01) | |

(52) U.S. Cl.
CPC .............. *G11B 5/71* (2013.01); *G11B 5/7028* (2013.01); *G11B 5/70626* (2013.01); *G11B 5/733* (2013.01); *G11B 5/78* (2013.01); *G11B 5/708* (2013.01); *G11B 5/7021* (2013.01); *G11B 5/70678* (2013.01); *G11B 5/7356* (2019.05)

(58) Field of Classification Search
None
See application file for complete search history.

(56) References Cited

U.S. PATENT DOCUMENTS

| | | | |
|---|---|---|---|
| 5,456,980 A | 10/1995 | Murakami et al. | |
| 7,682,443 B2 * | 3/2010 | Sato ..................... | C09D 17/003 106/493 |
| 10,861,491 B2 | 12/2020 | Oyanagi et al. | |
| 2014/0374645 A1 * | 12/2014 | Kikuchi ............... | G11B 5/7013 252/62.54 |
| 2016/0064024 A1 * | 3/2016 | Mikami ............... | G11B 5/7356 428/840.3 |
| 2017/0249963 A1 | 8/2017 | Oyanagi et al. | |

FOREIGN PATENT DOCUMENTS

| | | |
|---|---|---|
| JP | S64-033719 A | 2/1989 |
| JP | 6-248281 A | 9/1994 |
| JP | 2002-367142 A | 12/2002 |
| JP | 2017-157252 A | 9/2017 |

OTHER PUBLICATIONS

Japanese Office Action dated Jan. 18, 2022 issued in corresponding JP 2019-061238 with English Machine translation; 6 pages total.

* cited by examiner

*Primary Examiner* — Kevin M Bernatz
(74) *Attorney, Agent, or Firm* — Sughrue Mion, PLLC

(57) ABSTRACT

The magnetic recording medium includes: a non-magnetic support; and a magnetic layer including ferromagnetic powder, in which the magnetic layer includes a compound having a salt structure, and the salt structure is an ammonium salt structure of an alkyl ester anion represented by the following Formula 1. In Formula 1, R represents an alkyl group having 7 or more carbon atoms or a fluorinated alkyl group having 7 or more carbon atoms, $Z^+$ represents an ammonium cation, and a water contact angle on a surface of the magnetic layer is 80° or more and less than 100°. A magnetic recording and reproducing apparatus includes the magnetic recording medium.

Formula 1

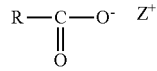

14 Claims, No Drawings

MAGNETIC RECORDING MEDIUM INCLUDING COMPOUND HAVING A SALT STRUCTURE AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-061238 filed on Mar. 27, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

A magnetic recording medium is generally manufactured by forming a magnetic layer including ferromagnetic powder and one or more any additives on a non-magnetic support. JP2002-367142A discloses that a lubricant such as a fatty acid ester is added to a magnetic layer.

SUMMARY OF THE INVENTION

In general, recording of data on a magnetic recording medium and reproducing of recorded data is performed by allowing the magnetic recording medium to run in a magnetic recording and reproducing apparatus and causing a magnetic layer surface of the magnetic recording medium and a magnetic head to come into contact with each other to be slid on each other. In a case where foreign matter adheres to the magnetic head due to the sliding with respect to the magnetic layer surface, a distance between the magnetic layer surface and the magnetic head is increased by the presence of foreign matter, and as a result, an output change called a spacing loss may occur. Therefore, it is desirable that the magnetic layer surface exhibits an abrasivity and foreign matter adhering to the magnetic head can be abraded and removed during being slid with respect to the magnetic layer surface because the spacing loss can be reduced. On the other hand, in a case where an abrasivity of the magnetic layer surface is too high, the magnetic head itself is abraded, and therefore it is desirable that the magnetic layer surface exhibits a moderate abrasivity.

In addition, from a viewpoint of running stability, it is desirable that a friction coefficient during sliding between the magnetic layer surface and the magnetic head is low even though the magnetic recording medium is repeatedly run. Further, from a viewpoint of maintaining the abrasivity of the magnetic layer surface, it is desirable that a change in surface shape of the magnetic layer is small before and after repeated running.

An object of an aspect of the present invention is to provide a magnetic recording medium capable of exhibiting a moderate abrasivity on a magnetic layer surface, a low friction coefficient even after repeated running, and a small change in surface shape of the magnetic layer before and after repeated running.

An aspect of the present invention relates to a magnetic recording medium comprising: a non-magnetic support; and a magnetic layer including ferromagnetic powder, in which the magnetic layer includes a compound having a salt structure, and the salt structure is an ammonium salt structure of an alkyl ester anion represented by the following Formula 1,

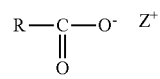

Formula 1 in Formula 1, R represents an alkyl group having 7 or more carbon atoms or a fluorinated alkyl group having 7 or more carbon atoms, $Z^+$ represents an ammonium cation, and a water contact angle on a surface of the magnetic layer is 80° or more and less than 100°.

In one aspect, the compound may be a salt of polyalkyleneimine with at least one fatty acid selected from the group consisting of a fatty acid having 7 or more carbon atoms and a fluorinated fatty acid having 7 or more carbon atoms.

In one aspect, the compound may be a salt of polyallylamine with at least one fatty acid selected from the group consisting of a fatty acid having 7 or more carbon atoms and a fluorinated fatty acid having 7 or more carbon atoms.

In one aspect, the water contact angle on the surface of the magnetic layer may be 80° or more and 95° or less.

In one aspect, the number of carbon atoms of the alkyl group or the fluorinated alkyl group represented by R in Formula 1 may be 7 or more and 18 or less.

In one aspect, the magnetic recording medium may further comprise a non-magnetic layer including non-magnetic powder between the non-magnetic support and the magnetic layer.

In one aspect, the magnetic recording medium may further comprise a back coating layer including non-magnetic powder on a surface side of the non-magnetic support opposite to a surface side provided with the magnetic layer.

In one aspect, the magnetic recording medium may be a magnetic tape.

Another aspect of the present invention relates to a magnetic recording and reproducing apparatus including the magnetic recording medium described above, and a magnetic head.

According to one aspect of the present invention, it is possible to provide a magnetic recording medium capable of exhibiting a moderate abrasivity on a magnetic layer surface, a low friction coefficient even after repeated running, and a small change in surface shape of the magnetic layer before and after repeated running. In addition, according to one aspect of the present invention, it is possible to provide a magnetic recording and reproducing apparatus including the magnetic recording medium.

DESCRIPTION OF THE PREFERRED EMBODIMENTS

Magnetic Recording Medium

An aspect of the present invention relates to a magnetic recording medium including a non-magnetic support and a magnetic layer including ferromagnetic powder, in which the magnetic layer includes a compound having a salt structure, and the salt structure is an ammonium salt structure of an alkyl ester anion represented by the following Formula 1, and a water contact angle on a surface of the magnetic layer is 80° or more and less than 100°.

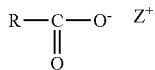

Formula 1

(in Formula 1, R represents an alkyl group having 7 or more carbon atoms or a fluorinated alkyl group having 7 or more carbon atoms, and $Z^+$ represents an ammonium cation.)

Hereinafter, the present inventors' supposition regarding the magnetic recording medium will be described.

A lubricant can be broadly classified into two groups of a fluid lubricant and a boundary lubricant. The present inventors consider that a compound having an ammonium salt structure of an alkyl ester anion represented by Formula 1 can function as a fluid lubricant. On the other hand, the fatty acid ester disclosed in JP2002-367142A described above is also said to be a component that can function as a fluid lubricant. It is considered that the fluid lubricant itself can play a role of imparting a lubricity to the magnetic layer by forming a liquid film on a surface of the magnetic layer. In order to reduce a friction coefficient after repeated running, it is considered desirable that a fluid lubricant forms a liquid film on the magnetic layer surface.

Incidentally, regarding a liquid film of the fluid lubricant, it is considered that a water contact angle of the magnetic layer surface is a value serving as an index of the amount of the fluid lubricant that forms the liquid film on the magnetic layer surface, and it is supposed that the larger the water contact angle is, the more the fluid lubricant forms the liquid film on the magnetic layer surface. From a viewpoint of causing the magnetic layer surface and the magnetic head to be stably slid on each other, it is considered desirable to use an appropriate amount of the fluid lubricant that forms the liquid film on the magnetic layer surface. This is because it is considered that in a case where the amount of a liquid lubricant that forms a liquid film on the magnetic layer surface is excessive, the magnetic layer surface and the magnetic head are stuck to each other, and sliding stability is lowered, and accordingly, the surface shape of the magnetic layer is likely to change during being slid with respect to the magnetic head in repeated running. Further, it is considered that in a case where the amount of the liquid lubricant that forms the liquid film on the magnetic layer surface is excessive, for example, a protrusion provided on the magnetic layer surface to bring about an abrasivity on the magnetic layer surface is covered with the liquid film, and thus the magnetic layer surface tends to be difficult to exhibit a moderate abrasivity. From this point of view, it is supposed that it is desirable to use an appropriate amount of the fluid lubricant forming the liquid film on the magnetic layer surface.

Regarding the above points, the compound contained in the magnetic layer of the magnetic recording medium includes an ammonium salt structure of an alkyl ester anion represented by Formula 1. It is considered that a compound including such a structure can play an excellent role as a fluid lubricant even in a small amount as compared with a fluid lubricant (for example, a fatty acid ester) used in a magnetic recording medium in the related art. It is supposed that this aspect leads to realization of a moderate abrasivity on the magnetic layer surface, a low friction coefficient after repeated running, and suppression of a change in surface shape of the magnetic layer before and after repeated running in a state where the liquid film of the fluid lubricant is formed on the magnetic layer surface in such an amount that the water contact angle on the magnetic layer surface is 80° or more and less than 100°.

However, the above is supposition and does not limit the present invention. Furthermore, the present invention is not limited to other suppositions described in this specification.

Hereinafter, the magnetic recording medium will be described later in detail.

In the present invention and this specification, unless otherwise noted, a group described may have a substituent or may be unsubstituted. The "number of carbon atoms" of a group having a substituent means a carbon number not including the carbon number of the substituent unless otherwise noted. In the present invention and this specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, a salt of a carboxy group, a sulfonic acid group, a salt of a sulfonic acid group, and the like.

Ammonium Salt Structure of Alkyl. Ester Anion represented by Formula 1 and Compound having this Structure The magnetic recording medium includes a compound having an ammonium salt structure of an alkyl ester anion represented by the following Formula 1 in a magnetic layer. This compound can form a liquid film on the magnetic layer surface, at least a part of which is contained in the magnetic layer and a part of which is contained inside the magnetic layer and moves to the magnetic layer surface during being slid with respect to the magnetic head. Further, a part thereof is contained in a non-magnetic layer which will be described later, and can move to the magnetic layer and further move to the magnetic layer surface to form a liquid film. The "alkyl ester anion" can also be referred to as an "alkyl carboxylate anion".

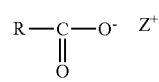

Formula 1

In Formula 1, R represents an alkyl group having 7 or more carbon atoms or a fluorinated alkyl group having 7 or more carbon atoms. The fluorinated alkyl group has a structure in which a part or all of hydrogen atoms constituting the alkyl group are substituted with fluorine atoms. The alkyl group or the fluorinated alkyl group represented by R may have a linear structure, a branched structure, a cyclic alkyl group or a fluorinated alkyl group, and a linear structure is preferable. The alkyl group or the fluorinated alkyl group represented by R may have a substituent, may be unsubstituted, and is preferably unsubstituted. The alkyl group represented by R can be represented by, for example, $C_nH_{2n+1}-$. Here, n represents an integer of 7 or more. The fluorinated alkyl group represented by R can have a structure in which a part or all of hydrogen atoms constituting the alkyl group represented by $C_nH_{2n+1}-$ are substituted with fluorine atoms, for example. The number of carbon atoms of the alkyl group or the fluorinated alkyl group represented by R is 7 or more, preferably 8 or more, more preferably 9 or more, still more preferably 10 or more, still more preferably 11 or more, still more preferably 12 or more, and still more preferably 13 or more, from a viewpoint of realization of a moderate abrasivity on the magnetic layer surface, a low friction coefficient after repeated running, and suppression of a change in surface shape of the magnetic layer before and after repeated running in a state where the liquid film of the fluid lubricant is formed on the magnetic layer surface in such an amount that the water contact angle on the magnetic layer surface is 80° or more and less than 100°. The number of carbon atoms of the alkyl group or the fluorinated alkyl group represented by R is preferably 20 or less, more preferably 19 or less, and still more preferably 18 or less from the above viewpoint.

In Formula 1, $Z^+$ represents an ammonium cation. Specifically, the ammonium cation has the following structure. In the present invention and this specification, "*" in the formula representing a part of a compound represents a bonding position between the partial structure and an adjacent atom.

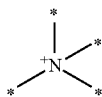

A nitrogen cation $N^+$ of the ammonium cation and an oxygen anion $O^-$ in Formula 1 can form a salt crosslinking group to form an ammonium salt structure of an alkyl ester anion represented by Formula 1. The fact that a compound having an ammonium salt structure of an alkyl ester anion represented by Formula 1 is contained in the magnetic layer can be confirmed by analyzing the magnetic recording medium by X-ray photoelectron spectroscopy (ESCA; Electron Spectroscopy for Chemical Analysis), infrared spectroscopy (IR), or the like.

In an aspect, the ammonium cation represented by $Z^+$ can be provided, for example, by a nitrogen atom of a nitrogen-containing polymer becoming a cation. The nitrogen-containing polymer means a polymer containing a nitrogen atom. In the present invention and this specification, the term "polymer" is used to encompass a homopolymer and a copolymer. In an aspect, a nitrogen atom can be contained as an atom constituting a main chain of a polymer, and in an aspect, a nitrogen atom can be contained as an atom constituting a side chain of a polymer.

As an aspect of the nitrogen-containing polymer, polyalkyleneimine can be mentioned. The polyalkyleneimine is a ring-opening polymer of alkyleneimine, and is a polymer having a plurality of repeating units represented by the following Formula 2.

Formula 2

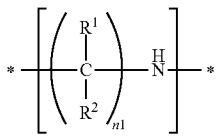

A nitrogen atom N constituting a main chain in Formula 2 can be converted to the nitrogen cation $N^+$ to provide the ammonium cation represented by $Z^+$ in Formula 1. Therefore, an ammonium salt structure can be formed with the alkyl ester anion, for example, as follows.

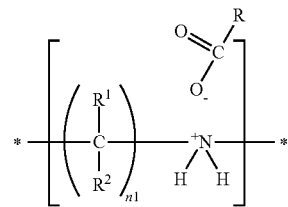

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and still more preferably a methyl group. The alkyl group represented by $R^1$ or $R^2$ is preferably an unsubstituted alkyl group. A combination of $R^1$ and $R^2$ in Formula 2 includes an aspect in which one is a hydrogen atom and the other is an alkyl group, an aspect in which both are hydrogen atoms, and an aspect in which both are alkyl groups (identical or different alkyl groups). Preferred is one aspect in which both are hydrogen atoms. As alkyleneimine that gives polyalkyleneimine, a structure having the smallest number of carbon atoms constituting a ring is ethyleneimine, and a main chain of alkyleneimine (ethyleneimine) obtained by ring opening of ethyleneimine has 2 carbon atoms. Therefore, n1 in Formula 2 is 2 or more. n1 in Formula 2 can be, for example, 10 or less, 8 or less, 6 or less, or 4 or less. The polyalkyleneimine may be a homopolymer including only the same structure as a repeating structure represented by Formula 2, or may be a copolymer containing two or more different structures as a repeating structure represented by Formula 2. A number-average molecular weight of the polyalkyleneimine that can be used to form a compound having an ammonium salt structure of an alkyl ester anion represented by Formula 1 can be, for example, 200 or more, preferably 300 or more, and more preferably, 400 or more. The number-average molecular weight of the polyalkyleneimine can be, for example, 10,000 or less, preferably 5,000 or less, and more preferably 2,000 or less.

In the present invention and this specification, an average molecular weight (a weight-average molecular weight and a number-average molecular weight) is a value measured by gel permeation chromatography (GPC) and calculated by standard polystyrene conversion. Unless otherwise noted, an average molecular weight shown in examples which will be described later is a value (in terms of polystyrene) obtained by performing standard polystyrene conversion of a value measured using GPC under the following measurement conditions.

GPC device: HLC-8220 (manufactured by Tosoh Corporation)

Guard column: TSK guard column Super HZM-H

Column: TSKgel Super HZ 2000, TSKgel Super HZ 4000, TSKgel Super HZ-M (manufactured by Tosoh Corporation, 4.6 mm (inner diameter)×15.0 cm, three types of columns connected in series)

Eluent: containing tetrahydrofuran (THF), stabilizer (2,6-di-t-butyl-4-methylphenol)

Eluent flow rate: 0.35 mL/min
Column temperature: 40° C.
Inlet temperature: 40° C.
Refractive index (RI) measurement temperature: 40° C.
Sample concentration: 0.3 mass %
Sample injection volume: 10 μL As another aspect of the nitrogen-containing polymer, polyallylamine can be mentioned. The polyallylamine is a polymer of allylamine, and is a polymer having a plurality of repeating units represented by the following Formula 3.

Formula 3

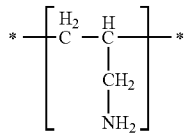

A nitrogen atom N constituting an amino group of a side chain in Formula 3 can be converted to the nitrogen cation $N^+$ to provide the ammonium cation represented by $Z^+$ in Formula 1. Therefore, an ammonium salt structure can be formed with the alkyl ester anion, for example, as follows.

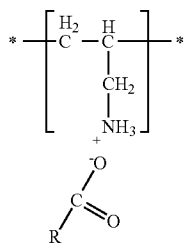

A weight-average molecular weight of the polyallylamine that can be used to form a compound having an ammonium salt structure of an alkyl ester anion represented by Formula 1 can be, for example, 200 or more, preferably 1,000 or more, and more preferably, 1,500 or more. The weight-average molecular weight of the polyallylamine can be, for example, 15,000 or less, preferably 10,000 or less, and more preferably 8,000 or less.

The fact that a compound having a structure derived from polyalkyleneimine or polyallylamine is contained as the compound having an ammonium salt structure of an alkyl ester anion represented by Formula 1 can be confirmed by analyzing the magnetic layer surface by time-of-flight secondary ion mass spectrometry (TOF-SIMS) and the like.

A compound having an ammonium salt structure of an alkyl ester anion represented by Formula 1 can be a salt of a nitrogen-containing polymer with at least one fatty acid selected from the group consisting of a fatty acid having 7 or more carbon atoms and a fluorinated fatty acid having 7 or more carbon atoms. The nitrogen-containing polymer that forms the salt can be one or more nitrogen-containing polymers, for example, a nitrogen-containing polymer selected from the group consisting of polyalkyleneimine and polyallylamine. The fatty acid that forms the salt can be one or more fatty acids selected from the group consisting of a fatty acid having 7 or more carbon atoms and a fluorinated fatty acid having 7 or more carbon atoms. The fluorinated fatty acid has a structure in which a part or all of hydrogen atoms constituting an alkyl group bonded to a carboxy group COOH in the fatty acid are substituted with fluorine atoms.

For example, salt formation reaction can easily be progressed by mixing the nitrogen-containing polymer and the fatty acid at room temperature. The room temperature is, for example, about 20° C. to 25° C. In an aspect, one or more nitrogen-containing polymers and one or more fatty acids are used as a component of a magnetic layer forming composition, and these are mixed in a preparation process of the magnetic layer forming composition. Thus, the salt formation reaction can be progressed. In addition, in an aspect, before preparing the magnetic layer forming composition, one or more nitrogen-containing polymers and one or more fatty acids are mixed to form a salt, and then the salt is used as a component of the magnetic layer forming composition to prepare the magnetic layer forming composition. This point is also applicable in forming the non-magnetic layer containing a compound having an ammonium salt structure of an alkyl ester anion represented by Formula 1. For example, for the magnetic layer, 0.1 to 10.0 parts by mass of the nitrogen-containing polymer can be used, and 0.5 to 8.0 parts by mass of the nitrogen-containing polymer is preferably used, per 100.0 parts by mass of ferromagnetic powder. The fatty acid can be used in an amount of, for example, 0.05 to 10.0 parts by mass, preferably 0.1 to 5.0 parts by mass, per 100.0 parts by mass of the ferromagnetic powder. For example, for the non-magnetic layer, 0.1 to 10.0 parts by mass of the nitrogen-containing polymer can be used, and 0.5 to 8.0 parts by mass of the nitrogen-containing polymer is preferably used, per 100.0 parts by mass of non-magnetic powder. The fatty acid can be used in an amount of, for example, 0.05 to 10.0 parts by mass, preferably 0.1 to 5.0 parts by mass, per 100.0 parts by mass of the non-magnetic powder. In a case where the nitrogen-containing polymer and the fatty acid are mixed to form an ammonium salt of an alkyl ester anion represented by Formula 1, the nitrogen atom constituting the nitrogen-containing polymer and the carboxy group of the fatty acid may react to form the following structure at the same time, and an aspect including such a structure is also included in the above compound.

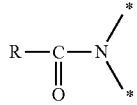

Examples of the fatty acid include a fatty acid having the alkyl group previously described as R in Formula 1 and a fluorinated fatty acid having the fluorinated alkyl group previously described as R in Formula 1.

A mixing ratio of the fatty acid and the nitrogen-containing polymer used to form a compound having an ammonium salt structure of an alkyl ester anion represented by Formula 1 is preferably 10:90 to 90:10, more preferably 20:80 to 85:15, and still more preferably 30:70 to 80:20, as a mass ratio of the nitrogen-containing polymer:the fatty acid. Further, a compound having an ammonium salt structure of an alkyl ester anion represented by Formula 1 is preferably contained in the magnetic layer in an amount of 0.01 parts by mass or more, more preferably 0.1 parts by mass or more, and still more preferably 0.5 parts by mass or more, with respect to 100.0 parts by mass of the ferromagnetic powder. Here, the content of the compound in the magnetic layer refers to the total amount of the amount forming a liquid film on the magnetic layer surface and the amount contained inside the magnetic layer. On the other hand, the high content of ferromagnetic powder in the magnetic layer is preferable from a viewpoint of high density recording. Therefore, from a viewpoint of high density recording, it is preferable that the content of components other than the ferromagnetic powder is small. From this viewpoint, the content of the compound in the magnetic layer is preferably 15.0 parts by mass or less, more preferably 10.0 parts by mass or less, and still more preferably 8.0 parts by mass or less, with respect to 100.0 parts by mass of the ferromagnetic powder. Moreover, a preferable range of the content of the compound of the magnetic layer forming composition used to form the magnetic layer is also the same.

Water Contact Angle on Magnetic Layer Surface

Regarding the magnetic layer of the magnetic recording medium, the water contact angle on the magnetic layer surface is 80° or more and less than 100°. The water contact angle on the magnetic layer surface of less than 100° is preferable for suppressing a change in surface shape of the magnetic layer before and after repeated running. In this respect, the water contact angle of the magnetic layer is preferably 99° or less, more preferably 98° or less, still more preferably 97° or less, still more preferably 96° or less, still more preferably 95° or less, still more preferably 94° or less, and still more preferably 93° or less. Further, the water contact angle on the magnetic layer surface of 80° or more is preferable from a viewpoint of providing a moderate abrasivity to the magnetic layer surface. From this point, the water contact angle on the magnetic layer surface is preferably 81° or more, more preferably 82° or more, and still more preferably 83° or more. The water contact angle on the magnetic layer surface can be controlled within the above range by using the above compound as a component for forming the magnetic recording medium and adjusting the amount of the compound used.

In the present invention and this specification, a "magnetic layer surface (surface of the magnetic layer)" is identical to a surface of the magnetic recording medium on a magnetic layer side. Further, the water contact angle is a value obtained by a liquid droplet method, and specifically, an arithmetic average of values obtained by performing measurement six times by a θ/2 method in a measurement environment with an atmosphere temperature of 25° C. and a relative humidity of 25%. Specific examples of measurement conditions will be described later with reference to the examples.

Hereinafter, the magnetic layer and the like of the magnetic recording medium will be described more specifically.

Magnetic Layer

Ferromagnetic Powder

The magnetic layer includes ferromagnetic powder. As the ferromagnetic powder included in the magnetic layer, one or a combination of two or more known types of ferromagnetic powder that are ferromagnetic powder used in the magnetic layer of various magnetic recording media, may be used. It is preferable to use ferromagnetic powder having a small average particle size, from a viewpoint of improvement of recording density. In this respect, an average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, an average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferable specific examples of ferromagnetic powder may include hexagonal ferrite powder. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, the hexagonal strontium ferrite powder means that the main divalent metal atom included in the powder is a strontium atom. In addition, the hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is an aspect of the hexagonal ferrite powder will be described in more detail.

An activation volume of hexagonal strontium ferrite powder is preferably in a range of 800 to 1500 $nm^3$. The particulate hexagonal strontium ferrite powder exhibiting an activation volume in the above range is suitable for manufacturing a magnetic recording medium exhibiting excellent electromagnetic conversion characteristics. The activation volume of the hexagonal strontium ferrite powder is preferably 800 $nm^3$ or more, for example, 850 $nm^3$ or more. Further, from a viewpoint of further improving the electromagnetic conversion characteristics, the activation volume of the hexagonal strontium ferrite powder is more preferably 1400 $nm^3$ or less, still more preferably 1300 $nm^3$ or less, still more preferably 1200 $nm^3$ or less, and still more preferably 1100 $nm^3$ or less.

The "activation volume" is a unit of magnetization reversal and is an index indicating the magnetic size of a particle. An activation volume described in the present invention and this specification and an anisotropy constant Ku which will be described later are values obtained from the following relational expression between a coercivity Hc and an activation volume V, by performing measurement in an He measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content>1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content>1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic recording medium. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually confirmed in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually confirmed in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 $A \cdot m^2/kg$ or more, and may be 47 $A \cdot m^2/kg$ or more. On the other hand, from a viewpoint of noise reduction, σs is preferably 80 $A \cdot m^2/kg$ or less and more preferably 60 $A \cdot m^2/kg$ or less. σs can be measured using a known measuring device, such as a vibrating sample magnetometer, capable of measuring magnetic properties. In the present invention and this specification, unless otherwise noted, the mass magnetization σs is a value measured at a magnetic field intensity of 1194 kA/m (15 kOe).

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M-type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1500 $nm^3$. The particulate ε-iron oxide powder exhibiting an activation volume in the above range is suitable for manufacturing a magnetic recording medium exhibiting excellent electromagnetic conversion characteristics. The activation volume of the ε-iron oxide powder is preferably 300 $nm^3$ or more, for example, 500 $nm^3$ or more. Further, from a viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, improving thermal stability may include an anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, it means that the higher Ku is, the higher thermal stability is, this is preferable, and thus, a value thereof is not limited to the values exemplified above.

From a viewpoint of increasing the reproducing output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 $A \cdot m^2/kg$ or more, and may be 12 $A \cdot m^2/kg$ or more. On the other hand, from a viewpoint of noise reduction, σs of the ε-iron oxide powder is preferably 40 $A \cdot m^2/kg$ or less and more preferably 35 $A \cdot m^2/kg$ or less.

In the present invention and this specification, unless otherwise noted, an average particle size of various types of powder such as ferromagnetic powder is a value measured by the following method using a transmission electron microscope.

The powder is imaged at a magnification ratio of 100,000 with a transmission electron microscope, and the image is printed on printing paper, is displayed on a display, or the like so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe a powder in some cases.

As a method of taking sample powder from the magnetic recording medium in order to measure the particle size, a method disclosed in a paragraph 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The magnetic layer includes the ferromagnetic powder, can include a binding agent, and can optionally include one or more additional additives. A high filling percentage of the ferromagnetic powder in the magnetic layer is preferable from a viewpoint of improvement of recording density.

Binding Agent and Curing Agent

The magnetic recording medium may be a coating type magnetic recording medium and may include a binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described later. For the binding agent described above, descriptions disclosed in paragraphs 0028 to 0031 of JP2010-024113A can also be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10,000 or more and 200,000 or less as a weight-average molecular weight.

In addition, a curing agent can also be used together with the resin which can be used as the binding agent. As the curing agent, in an aspect, a thermosetting compound which is a compound in which a curing reaction (crosslinking reaction) is progressed due to heating can be used, and in another aspect, a photocurable compound in which a curing reaction (crosslinking reaction) is progressed due to light irradiation can be used. At least a part of the curing agent can be included in the magnetic layer in a state of being reacted (crosslinked) with other components such as the binding agent, by progressing the curing reaction in a magnetic layer forming process. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The content of the curing agent in the magnetic layer forming composition can be, for example, 0 to 80.0 parts by mass, and from a viewpoint of improvement of a strength of the magnetic layer, can be 50.0 to 80.0 parts by mass with respect to 100.0 parts by mass of the binding agent.

Additive

The magnetic layer may include one or more kinds of additives, as necessary. As the additives, the curing agent described above is used as an example. In addition, examples of the additive included in the magnetic layer include non-magnetic powder, a lubricant, a dispersing agent, a dispersing assistant, an antibacterial agent, an antistatic agent, and an antioxidant. As the lubricant, for example, a fatty acid amide that can function as a boundary lubricant can be used. It is considered that the boundary lubricant is a lubricant that can reduce a contact friction by being adsorbed on a surface of powder (for example, ferromagnetic powder) to form a strong lubricant film. Examples of the fatty acid amide include, for example, amides of various fatty acids such as lauric acid, myristic acid, palmitic acid, stearic acid, oleic acid, linoleic acid, linolenic acid, behenic acid, erucic acid, and elaidic acid, specifically, a lauric acid amide, a myristic acid amide, a palmitic acid amide, a stearic acid amide, and the like. The content of the fatty acid amide in the magnetic layer is, for example, 0 to 3.0 parts by mass, preferably 0 to 2.0 parts by mass, and more preferably 0 to 1.0 part by mass per 100.0 parts by mass of the ferromagnetic powder. The non-magnetic layer may also contain a fatty acid amide. The content of the fatty acid amide in the non-magnetic layer is, for example, 0 to 3.0 parts by mass, and preferably 0 to 1.0 part by mass per 100.0 parts by mass of the non-magnetic powder. For the dispersing agent, descriptions disclosed in paragraphs 0061 and 0071 of JP2012-133837A can be referred to. A dispersing agent may be added to a non-magnetic layer forming composition. For the dispersing agent which can be added in the non-magnetic layer forming composition, a description disclosed in a paragraph 0061 of JP2012-133837A can be referred to. As the non-magnetic powder that can be included in the magnetic layer, non-magnetic powder which can function as an abrasive, or non-magnetic powder which can function as a protrusion forming agent which forms protrusions suitably protruded from the magnetic layer surface is used. Specific examples of the abrasive include types of powder of alumina ($Al_2O_3$) which is a material usually used as the abrasive of the magnetic layer, silicon carbide, boron carbide ($B_4C$), TiC, chromium oxide ($Cr_2O_3$), cerium oxide, zirconium oxide ($ZrO_2$), iron oxide, and diamond, among them, the types of powder of alumina such as α-alumina, silicon carbide, and diamond are preferable. The content of the abrasive in the magnetic layer is preferably 1.0 to 20.0 parts by mass, more preferably 3.0 to 15.0 parts by mass, and still more preferably 4.0 to 10.0 parts by mass, with respect to 100.0 parts by mass of the ferromagnetic powder. An average particle size of the abrasive is, for example, in a range of 30 to 300 nm, and preferably in a range of 50 to 200 mm Examples of the protrusion forming agent can include carbon black and a colloidal particle. The content of the protrusion forming agent in the magnetic layer is preferably 0.1 to 10.0 parts by mass, more preferably 0.1 to 5.0 parts by mass, and still more preferably 0.5 to 5.0 parts by mass, with respect to 100.0 parts by mass of the ferromagnetic powder. An average particle size of the colloidal particle is, for example, preferably in a range of 90 to 200 nm and more preferably in a range of 100 to 150 nm. An average particle size of the carbon black is preferably in a range of 5 to 200 nm and more preferably in a range of 10 to 150 nm.

The magnetic layer described above can be provided directly on a surface of the non-magnetic support or indirectly through the non-magnetic layer.

Non-Magnetic Layer

Next, the non-magnetic layer will be described. The above magnetic recording medium may have a magnetic layer directly on the surface of the non-magnetic support, or may have a magnetic layer on the surface of the non-magnetic support via a non-magnetic layer including non-magnetic powder. Non-magnetic powder used for the non-magnetic layer may be an inorganic powder or an organic powder. In addition, carbon black and the like can be used. Examples of the inorganic powder include powder such as metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

The non-magnetic layer can be a layer containing non-magnetic powder and a binding agent, and can further contain one or more additives. In regards to other details of a binding agent or an additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. 1 [kOe]=$10^6$/4 π[A/m]. It is preferable that the non-magnetic layer does not have a residual magnetic flux density and a coercivity.

In an aspect, a compound having an ammonium salt structure of an alkyl ester anion represented by Formula 1 can be included in the non-magnetic layer. A compound having an ammonium salt structure of an alkyl ester anion represented by Formula 1 is preferably contained in the non-magnetic layer in an amount of 0.01 parts by mass or more, more preferably in an amount of 0.1 parts by mass or more, and still more preferably 0.5 parts by mass or more, with respect to 100.0 parts by mass of the non-magnetic powder. The content of the compound in the non-magnetic layer is preferably 15.0 parts by mass or less, more preferably 10.0 parts by mass or less, and still more preferably 8.0 parts by mass or less, with respect to 100.0 parts by mass of the non-magnetic powder. Moreover, a preferable range of the content of the compound of the non-magnetic layer forming composition used to form the non-magnetic layer is also the same. The above compound contained in the non-magnetic layer can move to the magnetic layer and further move to the magnetic layer surface to form a liquid film. Details of the above compound that can be contained in the non-magnetic layer or the non-magnetic layer forming composition are as described above.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a heat treatment may be performed with respect to these supports in advance.

Back Coating Layer

The magnetic recording medium may include a back coating layer including non-magnetic powder on a surface side of the non-magnetic support opposite to the surface provided with the magnetic layer. Preferably, the back coating layer contains one or both of carbon black and inorganic powder. The back coating layer can be a layer containing non-magnetic powder and a binding agent, and can further contain one or more additives. In regards to the binding agent of the back coating layer and various additives that can optionally be included therein, the well-known technique regarding the back coating layer can be applied, and the well-known technique regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

A thickness of the non-magnetic support is, for example, 3.0 to 80.0 μm, preferably 3.0 to 20.0 μm, and more preferably 3.0 to 10.0 μm, and still more preferably 3.0 to 6.0 μm.

A thickness of the magnetic layer can be optimized according to a saturation magnetization amount, a head gap length, and a band of a recording signal of the magnetic head used. The thickness of the magnetic layer is preferably 10 nm to 150 nm, more preferably 20 nm to 120 nm, and still more preferably 30 nm to 100 nm from a viewpoint of high density recording. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 3.0 μm, preferably 0.1 to 2.0 μm, and more preferably 0.1 to 1.5 m.

A thickness of the back coating layer is preferably 0.9 μm or less, and more preferably in a range of 0.1 to 0.7 μm.

Thicknesses of each layer of the magnetic recording medium and the non-magnetic support can be obtained by a known film thickness measurement method. As an example, a cross section of the magnetic recording medium in a thickness direction is exposed by known means such as an ion beam or a microtome, and then the exposed cross section observation is performed using a scanning electron microscope, for example. In the cross section observation, various thicknesses can be obtained as a thickness obtained at any one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Method of Magnetic Recording Medium

A process of preparing a composition for forming the magnetic layer, and the optionally provided non-magnetic layer and back coating layer can generally include at least a kneading process, a dispersing process, and a mixing process provided before and after these processes as necessary. Each process may be divided into two or more stages. Components used for the preparation of each layer forming composition may be added at an initial stage or in a middle stage of each process. In addition, each raw material may be separately added in two or more processes. As described above, one or more nitrogen-containing polymers and one or more fatty acids are used as the component of the magnetic layer forming composition, and these are mixed in the preparation process of the magnetic layer forming composition. Thus, the salt formation reaction can be progressed. In addition, in an aspect, before preparing the magnetic layer forming composition, one or more nitrogen-containing polymers and one or more fatty acids are mixed to form a salt, and then the salt is used as a component of the magnetic layer forming composition to prepare the magnetic layer forming composition. This also applies to a preparation process of the non-magnetic layer forming composition. In order to prepare each layer forming composition, a well-known technique can be used. In the kneading process, preferably, a kneader having a strong kneading force such as an open kneader, a continuous kneader, a pressure kneader, or an extruder is used. Details of the kneading treatment are described in JP1989-106338A (JP-H01-106338A) and JP1989-079274A (JP-H01-079274A). Moreover, in order to disperse each layer forming composition, one or more kinds of dispersed beads selected from the group consisting of glass beads and other dispersed beads can be used as a dispersion medium. As such dispersed beads, zirconia beads, titania beads, and steel beads which are dispersed beads having a high specific gravity are suitable. These dispersed beads can be used by optimizing the particle diameter (bead diameter) and filling rate. As a dispersing device, a well-known dispersing device can be used. Each layer forming composition may be filtered by a well-known method before being subjected to a coating process. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed through a process of directly applying the magnetic layer forming composition onto the non-magnetic support surface or performing multilayer coating of the magnetic layer forming composition with the non-magnetic layer forming composition in order or at the same time. The back coating layer can be formed through a process of applying a back coating layer forming composition onto a surface of the non-magnetic support on a side opposite to a surface provided with the magnetic layer (or to be provided with the magnetic layer).

After the coating process, various treatments such as a drying treatment, an orientation treatment of the magnetic layer, and a surface smoothing treatment (calendering treatment) can be performed. For the coating process and various treatments, the well-known technologies can be applied, for example, descriptions disclosed in paragraphs 0051 to 0057 of JP2010-024113A can be referred to. For example, a vertical orientation treatment can be performed as the orientation treatment. The vertical orientation treatment can be performed by a well-known method such as a method using a polar opposing magnet. In an orientation zone, a drying speed of the coating layer can be controlled depending on a temperature and a flow rate of dry air and/or a transportation speed of the magnetic recording medium in the orientation zone. In addition, the coating layer may be preliminarily dried before the transportation to the orientation zone.

It is possible to form a servo pattern in the magnetic recording medium manufactured as described above by a known method in order to enable tracking control of the magnetic head in the magnetic recording and reproducing apparatus, control of a running speed of the magnetic recording medium, and the like. The "formation of servo pattern" can also be referred to as "recording of servo signal". The magnetic recording medium may be a tape-shaped magnetic recording medium (magnetic tape) or may be a disk-shaped magnetic recording medium (magnetic disk). Hereinafter, the formation of the servo pattern will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a magnetic field in one direction to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. For other details of the magnetic tape cartridge, the well-known technologies can be applied.

Magnetic Recording and Reproducing Apparatus

Another aspect of the present invention relates to a magnetic recording and reproducing apparatus including the magnetic recording medium described above, and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The magnetic recording and reproducing apparatus has only to include the magnetic recording medium according to one aspect of the present invention, and the well-known technology can be applied to the others.

For example, in a case of recording data and/or reproducing the recorded data on a magnetic recording medium in which a servo pattern is formed, first, tracking using a servo signal obtained by reading a servo pattern is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, an aspect of the present invention will be described with reference to examples. Here, the present invention is not limited to aspects shown in the examples. "Parts" and "%" in the following description mean "parts by mass" and "mass %", unless otherwise noted. "eq" is an equivalent and is a unit that cannot be converted into SI unit.

Moreover, the following various processes and operations were performed in an environment of a temperature of 20° C. to 25° C. and a relative humidity of 40% to 60%, unless otherwise noted.

In Table 1 below, "BaFe" represents hexagonal barium ferrite powder, "SrFe1" and "SrFe2" represent hexagonal strontium ferrite powder, and "ε-iron oxide" represents ε-iron oxide powder.

In Table 1, "BaFe" is the following hexagonal barium ferrite powder.

Composition excluding oxygen (molar ratio): Ba/Fe/Co/Zn=1/9/0.2/1

Coercivity Hc: 2000 Oe

Average particle size (average plate diameter): 20 nm

Average plate ratio: 2.7

Brunauer-emmett-teller (BET) specific surface area: 60 $m^2/g$

σs: 46 $A \cdot m^2/kg$

In Table 1, "SrFe1" is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed using a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle size of the hexagonal strontium ferrite powder obtained above was 18 nm, an activation volume was 902 nm$^3$, an anisotropy constant Ku was 2.2×10$^5$ J/m$^3$, and a mass magnetization σs was 49 A·m$^2$/kg.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was obtained.

Separately, 12 mg of sample powder was taken from the hexagonal strontium ferrite powder obtained above, elemental analysis of the filtrated solution obtained by completely dissolving this sample powder under dissolution conditions illustrated above was performed by an ICP analyzer, and a bulk content of a neodymium atom was obtained.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M-type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 1, "SrFe2" is hexagonal strontium ferrite powder manufactured by the following method.

1725 g of SrCO$_3$, 666 g of H$_3$BO$_3$, 1332 g of Fe$_2$O$_3$, 52 g of Al(OH)$_3$, 34 g of CaCO$_3$, and 141 g of BaCO$_3$ were weighed and mixed using a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was quenched and rolled by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle size of the obtained hexagonal strontium ferrite powder was 19 nm, an activation volume was 1102 nm$^3$, an anisotropy constant Ku was 2.0×10$^5$ J/m$^3$, and a mass magnetization as was 50 A·m$^2$/kg.

In Table 1, "ε-iron oxide" is ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide ($\varepsilon$-$Ga_{0.28}Co_{0.05}Ti_{0.05}Fe_{1.62}O_3$). In addition, X-ray diffraction analysis was performed under the same condition as that described above for SrFe1, and from a peak of an X-ray diffraction pattern, it was confirmed that the obtained ferromagnetic powder does not include α-phase and γ-phase crystal structures, and has a single-phase and ε-phase crystal structure (ε-iron oxide type crystal structure).

An average particle size of the obtained ε-iron oxide powder was 12 nm, an activation volume was 746 $nm^3$, an anisotropy constant Ku was $1.2 \times 10^5$ $J/m^3$, and a mass magnetization as was 16 $A \cdot m^2/kg$.

The activation volume and the anisotropy constant Ku of each of the above hexagonal strontium ferrite powder and ε-iron oxide powder are values obtained by the method described above for each ferromagnetic powder using a vibrating sample magnetometer (manufactured by Toei Industry Co.; Ltd.).

A mass magnetization as is a value measured at a magnetic field intensity of 15 kOe using a vibrating sample magnetometer (manufactured by Toei Industry Co., Ltd.).

Example 1

Preparation of Magnetic Layer Forming Composition

The following components were kneaded by an open kneader and then dispersed using a sand mill.

Ferromagnetic powder (type: see Table 1): 100.0 parts
Polyurethane resin: (Vylon (registered trademark) UR4800 manufactured by TOYOBO CO., LTD., functional group: $SO_3Na$, functional group concentration: 70 eq/ton): 4.0 parts
Vinyl chloride resin (MR104 manufactured by Kaneka Corporation): 10.0 parts
Methyl ethyl ketone: 150.0 parts
Cyclohexanone: 150.0 parts
α-$Al_2O_3$ (average particle size: 0.1 μm): 6.0 parts
Carbon black (average particle size: 20 nm): 0.7 parts After adding the following components to the dispersion liquid obtained above and stirring, the resultant mixture was subjected to an ultrasonic process and filtered using a filter having a pore diameter of 1 μm to prepare a magnetic layer forming composition.

Component 1 (See Table 1 for type and content)
Component 2 (See Table 1 for type and content)
Stearic acid amide: 0.3 parts
Methyl ethyl ketone: 110.0 parts
Cyclohexanone: 110.0 parts
Polyisocyanate compound (CORONATE 3041 manufactured by Tosoh Corporation): 5.0 parts Preparation of Non-Magnetic Layer Forming Composition The following components were kneaded by an open kneader and then dispersed using a sand mill. The obtained dispersion liquid was filtered using a filter having a pore diameter of 1 μm to prepare a non-magnetic layer forming composition.

Carbon black: 100.0 parts
Dibutyl phthalate (DBP) oil absorption: 100 ml/100 g
pH: 8
BET specific surface area: 250 $m^2/g$
Volatile content: 1.5%
Polyurethane resin (UR4800 manufactured by TOYOBO CO., LTD., functional group: $SO_3Na$, functional group concentration: 70 eq/ton): 20.0 parts
Vinyl chloride resin (functional group: $OSO_3K$, functional group concentration: 70 eq/ton): 30.0 parts
Trioctylamine: 4.0 parts
Cyclohexanone: 140.0 parts
Methyl ethyl ketone: 170.0 parts
Component 1 (same as Component 1 of magnetic layer forming composition described in Table 1, content is twice the amount described in Table 1 with respect to 100.0 parts of carbon black)
Component 2 (same as Component 2 of magnetic layer forming composition described in Table 1, content is twice the amount described in Table 1 with respect to 100.0 parts of carbon black)
Stearic acid amide: 0.3 parts
Toluene: 3.0 parts
Polyisocyanate compound (CORONATE 3041 manufactured by Tosoh Corporation): 5.0 parts Preparation of Back Coating Layer Forming Composition The following components were pre-kneaded by a roll mill and then dispersed using a sand mill. 4.0 parts of a polyester resin (Vylon 500 manufactured by TOYOBO CO., LTD.), 14.0 parts of a polyisocyanate compound (CORONATE 3041 manufactured by Tosoh Corporation), and 5.0 parts of α-$Al_2O_3$ (manufactured by Sumitomo Chemical Co., Ltd.) were added to the obtained dispersion liquid, and the mixture was stirred and then filtered to prepare a back coating layer forming composition.

Carbon black (average particle size: 40 nm): 85.0 parts
Carbon black (average particle size: 100 nm): 3.0 parts
Nitrocellulose: 28.0 parts
Polyurethane resin: 58.0 parts
Copper phthalocyanine dispersing agent: 2.5 parts
Nippollan 2301 (manufactured by Tosoh Corporation): 0.5 parts
Methyl isobutyl ketone: 0.3 parts
Methyl ethyl ketone: 860.0 parts
Toluene: 240.0 parts Manufacturing of Magnetic Recording Medium Both surfaces of a biaxially stretched polyethylene naphthalate support having a thickness of 5.0 μm were subjected to a corona discharge treatment.

The non-magnetic layer forming composition was applied onto one surface of the polyethylene naphthalate support so that the non-magnetic layer had a thickness after drying of 1.0 μm, and immediately after that, the magnetic layer forming composition was simultaneously applied thereonto in multilayers so that the magnetic layer had a thickness after drying of 100 nm. While both layers were in a wet state, a vertical orientation treatment was performed by a cobalt magnet having a magnetic force of 0.5 T (Tesla) and a solenoid having a magnetic force of 0.4 T, and then a drying treatment was performed. Thereafter, the back coating layer forming composition was applied onto the other surface of the polyethylene naphthalate support so that the back coating layer had a thickness after drying of 0.5 μm, and then a calendering treatment was performed using a seven-stage calendar configured with a metal roll, at a surface temperature of a calendar roll of 100° C. and a speed of 80 m/min. Thereafter, slitting was performed so as to have a width of ½ inches (1 inch is 0.0254 meters) to manufacture a magnetic tape.

Examples 2 to 33 and Comparative Examples 1 to 7

A magnetic tape was manufactured in the same manner as in Example 1 except that various items were changed as shown in Table 1.

"Polyethyleneimine" in Table 1 is a commercial product manufactured by Nippon Shokubai Co., Ltd., and Mn shown in parentheses is a number-average molecular weight.

"Polyallylamine" in Table 1 is a commercial product manufactured by Nittobo Medical Co., Ltd., and Mn shown in parentheses is a weight-average molecular weight.

The fact that a compound including an ammonium salt structure of an alkyl ester anion represented by Formula 1 which was formed by Component 1 and Component 2 is contained in the magnetic layer of the magnetic tape of each example shown in Table 1 was confirmed by the following method.

A sample was cut out from each magnetic tape of the examples shown in Table 1, and X-ray photoelectron spectroscopic analysis was performed on the magnetic layer surface (measurement region: 300 μm×700 μm) using an ESCA apparatus. Specifically, wide scan measurement was performed by an ESCA apparatus under the following measurement conditions. In measurement results, a peak was confirmed at a position corresponding to the binding energy of the ester anion and a position corresponding to the binding energy of the ammonium cation.

Apparatus: AXIS-ULTRA manufactured by Shimadzu Corporation
Excitation X-ray source: monochromatic Al-Kα ray
Scan range: 0 to 1200 eV
Pass energy: 160 eV
Energy resolution: 1 eV/step
Dwell time: 100 ms/step
Cumulative time: 5

In addition, a sample piece having a length of 3 cm was cut out from each magnetic tape of the examples shown in Table 1, and attenuated total reflection-fourier transform-infrared spectrometer (ATR-FT-IR) measurement (reflection method) of the magnetic layer surface was performed. In measurement results, absorption was confirmed at a wave number (1540 cm$^{-1}$ or 1430 cm$^{-1}$) corresponding to absorption of COO" and a wave number (2400 cm$^{-1}$) corresponding to absorption of the ammonium cation.

Evaluation Method
Water Contact Angle on Magnetic Layer Surface
The water contact angle of the magnetic layer surface was measured by the following method using a contact angle meter (contact angle measuring device DropMaster 700 manufactured by Kyowa Interface Science, Inc).

A tape sample was cut out from each magnetic tape of the examples and the comparative examples. The tape sample was placed on a slide glass so that the back coating layer surface was in contact with a surface of the slide glass. After 2.0 μl of a measurement liquid (water) was added dropwise onto a surface of the tape sample (magnetic layer surface) and it was visually confirmed that the liquid added dropwise formed a stable liquid droplet, a liquid droplet image was analyzed by contact angle analysis software FAMAS attached to the contact angle meter, and a contact angle between the tape sample and the liquid droplet was measured. The contact angle was calculated by a θ/2 method, and an arithmetic average of values measured six times per sample was taken as the water contact angle. The measurement was performed in an environment of a temperature of 25° C. and a relative humidity of 25%, and the water contact angle was obtained under the following analysis conditions.

Method: liquid droplet method (θ/2 method)
Droplet landing recognition: automatic
Droplet landing recognition line (distance from needle tip): 50 dots
Algorithm: automatic
Image mode: frame
Threshold level: automatic
Abrasivity of Magnetic Layer Surface Under an environment controlled at an atmosphere temperature of 23° C. and a relative humidity of 50%, the magnetic layer surface of the unrunning magnetic tape was bought into contact with one edge of an AlFeSil square bar (square bar specified by European Computer Manufacturers Association (ECMA)-288/Annex H/H2) at a lap angle of 12 degrees so as to be orthogonal to a longitudinal direction of the AlFeSil square bar, and in that state, the magnetic tape having a length of 580 m was run back and forth 50 times at a speed of 3 m/sec under a tension of 1.0 N. The AlFeSil square bar is an AlFeSil square bar made of AlFeSil which is an alloy of Sendust.

An abrasion width (AlFeSil abrasion width) disclosed in a paragraph 0015 of JP2007-026564A based on FIG. 1 of the same publication was obtained, by observing the edge of the square bar from above using an optical microscope. An abrasivity of the magnetic layer surface was evaluated from the obtained abrasion width according to the following evaluation standard. A unit of the abrasion width is μm. In a case where an evaluation result is A or B, it can be determined that an abrasivity exhibited by the magnetic layer surface is moderate, and in a case where the evaluation result is A, it can be determined that it is more preferable.

A: abrasion width of 15 or more and less than 25
B: abrasion width of 25 or more and 40 or less
C: abrasion width of less than 15 or more than 40
Friction Coefficient after Repeated Running In an environment of an atmosphere temperature of 13° C. and a relative humidity of 80%, the magnetic head removed from a Linear Tape-Open (LTO) (registered trademark) Generation 7 (G7) drive manufactured by IBM Corporation was attached to a tape running system, and 10000 cycles were run at 4.0 m/s while feeding out the magnetic tape having a tape length of 20 m from a feed roll and winding it up on a winding roll while applying a tension of 0.6 N (Newton).

During the first pass and 10000th cycle, a frictional force applied to the magnetic head during each running was measured using a strain gauge, and a friction coefficient μ value was obtained from the measured frictional force. From the measured value, the friction coefficient after repeated running was evaluated according to the following evaluation standard.

Evaluation Standard
A: μ value of less than 0.08
B: μ value of 0.08 or more and 0.12 or less
C: μ value of more than 0.12

Change in Surface Shape of Magnetic Layer Before and after Repeated Running

For each magnetic tape of the examples and the comparative examples, the number of protrusions having a height of 5 nm or more on the magnetic layer surface was obtained by the following method for the unrunning magnetic tape and the magnetic tape after repeated running in the above environment.

The number of protrusions having a height of 5 nm or more was obtained by measurement using an atomic force microscope (AFM). Specifically, in a planar image of the magnetic layer surface obtained by AFM, a plane in which volumes of a protruding component and an indenting component in a measurement region become equal to each other was defined as a reference plane, and the number of protrusions having a height of 5 nm or more above this reference plane was obtained. Among the protrusions having a height of 5 nm or more existing in the measurement region, there may be a protrusion of which one part is within the measurement region and the other part is outside the measurement region. In a case of obtaining the number of protrusions, the number of protrusions including such a protrusion was measured.

The measurement region for measurement using AFM was a 5 μm square (5 μm×5 μm) region on the magnetic layer surface. The measurement was performed in three different measurement regions on the magnetic layer surface (n=3). As an arithmetic average of three values obtained by such measurement, the number of protrusions having a height of 5 nm or more was obtained. The following measurement conditions were employed as measurement conditions of AFM.

A 5 μm square (5 μm×5 μm) region on the magnetic layer surface of the magnetic tape was measured using AFM (Nanoscope 4 manufactured by Veeco Corporation) in a tapping mode. RTESP-300 manufactured by BRUKER Japan K.K. was used as a probe, a resolution was set to 512 pixels×512 pixels, and a scanning speed was set to a speed at which one screen (512 pixels×512 pixels) was measured in 341 seconds.

A change in surface shape of the magnetic layer before and after repeated running was evaluated from a protrusion reduction rate calculated by the following equation according to the following evaluation standard. It can be determined that the smaller the value of the protrusion reduction rate, the more the change in surface shape of the magnetic layer before and after repeated running is suppressed.

Protrusion reduction rate (%)=[{(number of protrusions obtained for the unrunning magnetic tape)−(number of protrusions obtained for the magnetic tape after the repeated running)/(number of protrusions obtained for the unrunning magnetic tape)]×100

Evaluation Standard
A: 20% or less
B: more than 20% and less than 40%
C: 40% or more The above results are shown in Table 1 (Table 1-1 to Table 1-3).

TABLE 1

| | | Magnetic layer forming composition | | | | Water contact | Evaluation result | | Change in shape of magnetic layer |
| | | | | | | | | | |
| | Ferromagnetic powder | Component 1 | | Component 2 | | angle on magnetic layer surface | Friction coefficient after repeated running | Abrasivity | surface before and after repeated running |
| | | Type | Content | Type | Content | | | | |
| Examples and Comparative Examples of BaFe use | | | | | | | | | |
| Example 1 | BaFe | Polyethyleneimine (Mn 300) | 2.0 parts | Stearic acid | 0.5 parts | 90° | A | A | A (20%) |
| Example 2 | BaFe | Polyethyleneimine (Mn 1200) | 2.0 parts | Stearic acid | 0.5 parts | 90° | A | A | A (5%) |
| Example 3 | BaFe | Polyethyleneimine (Mn 1800) | 2.0 parts | Stearic acid | 0.5 parts | 90° | A | A | A (2%) |
| Comparative Example 1 | BaFe | Polyethyleneimine (Mn 600) | 2.0 parts | Hexanoic acid | 0.5 parts | 82° | B | B | C (40%) |
| Example 4 | BaFe | Polyethyleneimine (Mn 600) | 2.0 parts | Oleic acid | 0.5 parts | 85° | A | A | B (30%) |
| Example 5 | BaFe | Polyethyleneimine (Mn 600) | 2.0 parts | Dodecanoic acid | 0.5 parts | 85° | A | A | B (30%) |
| Example 6 | BaFe | Polyethyleneimine (Mn 600) | 2.0 parts | Palmitic acid | 0.5 parts | 90° | A | A | A (20%) |
| Example 7 | BaFe | Polyethyleneimine (Mn 600) | 2.0 parts | Stearic acid | 0.5 parts | 90° | A | A | A (10%) |
| Example 8 | BaFe | Polyethyleneimine (Mn 600) | 2.0 parts | Stearic acid | 1.3 parts | 95° | A | A | A (5%) |
| Example 9 | BaFe | Polyethyleneimine (Mn 600) | 2.0 parts | Stearic acid | 4.0 parts | 95° | A | A | A (5%) |
| Example 10 | BaFe | Polyethyleneimine (Mn 600) | 2.0 parts | Stearic acid | 9.2 parts | 98° | A | A | B (30%) |
| Example 11 | BaFe | Polyethyleneimine (Mn 600) | 2.0 parts | Stearic acid | 13.2 parts | 98° | A | B | B (30%) |

TABLE 1-continued

| | | Magnetic layer forming composition | | | | Water contact angle on magnetic layer surface | Evaluation result | | |
|---|---|---|---|---|---|---|---|---|---|
| | Ferro-magnetic powder | Component 1 | | Component 2 | | | Friction coefficient after repeated running | Abra-sivity | Change in shape of magnetic layer surface before and after repeated running |
| | | Type | Content | Type | Content | | | | |
| Comparative Example 2 | BaFe | Polyethyleneimine (Mn 600) | 2.0 parts | Nonafluoro-valeric acid | 0.5 parts | 98° | B | B | C (40%) |
| Example 12 | BaFe | Polyethyleneimine (Mn 600) | 2.0 parts | Heptadeca-fluorononanoic acid | 0.5 parts | 98° | A | A | B (30%) |
| Example 13 | BaFe | Polyethyleneimine (Mn 1600) | 2.0 parts | Stearic acid | 0.5 parts | 90° | A | A | A (10%) |
| Comparative Example 3 | BaFe | None | — | None | — | 90° | C | C | C (100%) |
| Comparative Example 4 | BaFe | Polyethyleneimine (Mn 600) | 2.0 parts | None | — | 80° | C | C | C (60%) |
| Comparative Example 5 | BaFe | Octylamine | 2.0 parts | Stearic acid | 0.5 parts | 100° | B | C | C (40%) |
| Comparative Example 6 | BaFe | Butyl stearate | 2.0 parts | Stearic acid | 0.5 parts | 100° | B | B | C (80%) |
| Comparative Example 7 | BaFe | Polyethyleneimine (Mn 600) | 5.0 parts | None | — | 75° | C | C | C (80%) |
| Examples and Comparative Examples of SrFe1 use | | | | | | | | | |
| Example 14 | SrFe1 | Polyethyleneimine (Mn 300) | 2.0 parts | Stearic acid | 0.5 parts | 90° | B | A | B (30%) |
| Example 15 | SrFe1 | Polyethyleneimine (Mn 1200) | 2.0 parts | Stearic acid | 0.5 parts | 90° | A | A | A (10%) |
| Example 16 | SrFe1 | Polyethyleneimine (Mn 1800) | 2.0 parts | Stearic acid | 0.5 parts | 90° | A | A | A (5%) |
| Example 17 | SrFe1 | Polyethyleneimine (Mn 600) | 2.0 parts | Dodecanoic acid | 0.5 parts | 85° | B | A | B (35%) |
| Example 18 | SrFe1 | Polyethyleneimine (Mn 600) | 2.0 parts | Palmitic acid | 0.5 parts | 90° | B | A | B (30%) |
| Example 19 | SrFe1 | Polyethyleneimine (Mn 600) | 2.0 parts | Stearic acid | 0.5 parts | 90° | A | A | A (20%) |
| Example 20 | SrFe1 | Polyethyleneimine (Mn 600) | 2.0 parts | Stearic acid | 1.3 parts | 95° | A | A | A (10%) |
| Example 21 | SrFe1 | Polyethyleneimine (Mn 600) | 2.0 parts | Stearic acid | 4.0 parts | 95° | A | A | A (10%) |
| Example 22 | SrFe1 | Polyethyleneimine (Mn 600) | 2.0 parts | Heptadeca-fluorononanoic acid | 0.5 parts | 98° | B | A | B (35%) |
| Example 23 | SrFe1 | Polyallylamine (Mw 1600) | 2.0 parts | Stearic acid | 0.5 parts | 90° | A | A | A (20%) |
| Examples and Comparative Examples of SrFe2 use | | | | | | | | | |
| Example 24 | SrFe2 | Polyethyleneimine (Mn 300) | 2.0 parts | Stearic acid | 0.5 parts | 90° | B | A | B (30%) |
| Example 25 | SrFe2 | Polyethyleneimine (Mn 1200) | 2.0 parts | Stearic acid | 0.5 parts | 90° | A | A | A (10%) |
| Example 26 | SrFe2 | Polyethyleneimine (Mn 1800) | 2.0 parts | Stearic acid | 0.5 parts | 90° | A | A | A (5%) |
| Example 27 | SrFe2 | Polyethyleneimine (Mn 600) | 2.0 parts | Dodecanoic acid | 0.5 parts | 85° | B | A | B (35%) |
| Example 28 | SrFe2 | Polyethyleneimine (Mn 600) | 2.0 parts | Palmitic acid | 0.5 parts | 90° | B | A | B (30%) |
| Example 29 | SrFe2 | Polyethyleneimine (Mn 600) | 2.0 parts | Stearic acid | 0.5 parts | 90° | A | A | A (20%) |
| Example 30 | SrFe2 | Polyethyleneimine (Mn 600) | 2.0 parts | Stearic acid | 1.3 parts | 95° | A | A | A (10%) |
| Example 31 | SrFe2 | Polyethyleneimine (Mn 600) | 2.0 parts | Stearic acid | 4.0 parts | 95° | A | A | A (10%) |
| Example 32 | SrFe2 | Polyethyleneimine (Mn 600) | 2.0 parts | Heptadeca-fluorononanoic acid | 0.5 parts | 98° | B | A | B (35%) |
| Example 33 | SrFe2 | Polyallylamine (Mw 1600) | 2.0 parts | Stearic acid | 0.5 parts | 90° | A | A | A (20%) |
| Examples and Comparative Examples of ε-iron oxide use | | | | | | | | | |
| Example 34 | ε-Iron oxide | Polyethyleneimine (Mn 1200) | 2.0 parts | Stearic acid | 0.5 parts | 90° | A | A | A (20%) |
| Example 35 | ε-Iron oxide | Polyethyleneimine (Mn 1800) | 2.0 parts | Stearic acid | 0.5 parts | 90° | A | A | A (10%) |

TABLE 1-continued

| | Magnetic layer forming composition | | | | | Evaluation result | | | |
|---|---|---|---|---|---|---|---|---|---|
| | | Component 1 | | Component 2 | | Water contact angle on magnetic layer | Friction coefficient after | | Change in shape of magnetic layer surface before and after repeated |
| | Ferromagnetic powder | Type | Content | Type | Content | surface | repeated running | Abrasivity | running |
| Example 36 | ε-Iron oxide | Polyethyleneimine (Mn 600) | 2.0 parts | Palmitic acid | 0.5 parts | 90° | B | A | B (35%) |
| Example 37 | ε-Iron oxide | Polyethyleneimine (Mn 600) | 2.0 parts | Stearic acid | 0.5 parts | 90° | B | A | B (30%) |
| Example 38 | ε-Iron oxide | Polyethyleneimine (Mn 600) | 2.0 parts | Stearic acid | 1.3 parts | 95° | A | A | A (20%) |
| Example 39 | ε-Iron oxide | Polyethyleneimine (Mn 600) | 2.0 parts | Stearic acid | 4.0 parts | 95° | A | A | A (20%) |
| Example 40 | ε-Iron oxide | Polyallylamine (Mw 1600) | 2.0 parts | Stearic acid | 0.5 parts | 90° | A | A | B (30%) |

From the results shown in Table 1, it can be confirmed that the magnetic tape of the examples exhibits a moderate abrasivity on a magnetic layer surface, a low friction coefficient even after repeated running, and a small change in surface shape of the magnetic layer before and after repeated running.

One aspect of the present invention is effective in a technical field of a magnetic recording medium for high-density recording.

What is claimed is:

1. A magnetic recording medium comprising:
a non-magnetic support; and
a magnetic layer including ferromagnetic powder,
wherein the magnetic layer includes a compound having a salt structure, and
the salt structure is an ammonium salt structure of an alkyl ester anion represented by the following Formula 1,

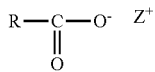

Formula 1 in Formula 1, R represents an alkyl group having 7 or more carbon atoms or a fluorinated alkyl group having 7 or more carbon atoms, $Z^+$ represents an ammonium cation, and a water contact angle on a surface of the magnetic layer is 80° or more and 94° or less.

2. The magnetic recording medium according to claim 1, wherein the compound is a salt of polyalkyleneimine with at least one fatty acid selected from the group consisting of a fatty acid having 7 or more carbon atoms and a fluorinated fatty acid having 7 or more carbon atoms.

3. The magnetic recording medium according to claim 1, wherein the compound is a salt of polyallylamine with at least one fatty acid selected from the group consisting of a fatty acid having 7 or more carbon atoms and a fluorinated fatty acid having 7 or more carbon atoms.

4. The magnetic recording medium according to claim 1, wherein the number of carbon atoms of the alkyl group or the fluorinated alkyl group represented by R in Formula 1 is 7 or more and 18 or less.

5. The magnetic recording medium according to claim 1, further comprising:
a non-magnetic layer including non-magnetic powder between the non-magnetic support and the magnetic layer.

6. The magnetic recording medium according to claim 1, further comprising:
a back coating layer including non-magnetic powder on a surface side of the non-magnetic support opposite to a surface side provided with the magnetic layer.

7. The magnetic recording medium according to claim 1, which is a magnetic tape.

8. A magnetic recording and reproducing apparatus comprising:
the magnetic recording medium according to claim 1; and
a magnetic head.

9. The magnetic recording and reproducing apparatus according to claim 8,
wherein the compound is a salt of polyalkyleneimine with at least one fatty acid selected from the group consisting of a fatty acid having 7 or more carbon atoms and a fluorinated fatty acid having 7 or more carbon atoms.

10. The magnetic recording and reproducing apparatus according to claim 8,
wherein the compound is a salt of polyallylamine with at least one fatty acid selected from the group consisting of a fatty acid having 7 or more carbon atoms and a fluorinated fatty acid having 7 or more carbon atoms.

11. The magnetic recording and reproducing apparatus according to claim 8,
wherein the number of carbon atoms of the alkyl group or the fluorinated alkyl group represented by R in Formula 1 is 7 or more and 18 or less.

12. The magnetic recording and reproducing apparatus according to claim 8,
wherein the magnetic recording medium further comprises a non-magnetic layer including non-magnetic powder between the non-magnetic support and the magnetic layer.

13. The magnetic recording and reproducing apparatus according to claim 8,
wherein the magnetic recording medium further comprises a back coating layer including non-magnetic powder on a surface side of the non-magnetic support opposite to a surface side provided with the magnetic layer.

14. The magnetic recording and reproducing apparatus according to claim 8,
wherein the magnetic recording medium is a magnetic tape.

* * * * *